United States Patent

[11] 3,625,362

| [72] | Inventor | Marcel Clarence Sicard<br>Cheshire, Conn. |
|---|---|---|
| [21] | Appl. No. | 829,451 |
| [22] | Filed | June 2, 1969 |
| [45] | Patented | Dec. 7, 1971 |
| [73] | Assignee | AMF Incorporated |

[54] REMOVAL OF OIL FROM WATER
10 Claims, 6 Drawing Figs.

[52] U.S. Cl............................................ 210/96,
 210/110, 210/196, 210/298, 210/488
[51] Int. Cl............................................ B01d 25/18
[50] Field of Search............................................ 210/96,
 110, 111, 137, 196, 297, 298, 488

[56] References Cited
UNITED STATES PATENTS

| 2,873,030 | 2/1959 | Ashton | 210/488 X |
| 3,034,656 | 5/1962 | Kasten | 210/492 |
| 3,214,368 | 10/1965 | Muller | 210/488 X |
| 3,253,711 | 5/1966 | Young | 210/96 X |
| 3,468,421 | 9/1969 | Hazel et al. | 210/96 |

Primary Examiner—Frank A. Spear, Jr.
Attorneys—George W. Price and Murray Schaffer ABSTRACT: A combination filter/separator device and a system for its application which will separate a mixture, or suspension or emulsion of incompletely miscible fluids of different physical characteristics and deliver one component in a filtered condition and the others containing all of the original particulate contamination.

PATENTED DEC 7 1971 3,625,362

INVENTOR.
MARCEL CLARENCE SICARD
BY
ATTORNEY

REMOVAL OF OIL FROM WATER

The present invention relates to a device for separating a mixture or suspension or emulsion of two or more incompletely miscible fluids of differing viscosities and/or specific gravities and/or adhesive qualities and the separate delivery of one component in a relatively pure particulate-free condition and of the other in a relatively pure but unfiltered condition.

Various such mixtures occur primarily in shipping and in various industrial processes. Most have relatively low percentages of oil in water and they occur occasionally by accident and more often by design for lack of existing suitable means of separation. Practically all are considered as waste products of no value and are usually disposed of by casual dumping in the most convenient manner which generally means that they end up polluting our waters or our atmosphere. In practically all cases it would be advantageous to health, aesthetics and economics to be able to separate the oil phase for safe disposal or reuse and only dump relatively clean water with low pollution potential. The most troublesome such mixture at the present time is heavy fuel oil in water which is common both by accident and design and which will be here considered in an illustrative but not exclusive sense.

For instance, it is well known that fuel tanks on ships, when emptied, are immediately filled with water to provide proper ballast for the ship. Of course, the fuel tank is not completely empty and the water and residue in the tanks combine to form a mixture or emulsion of oil and water. Prior to refueling, the ship, of course must deballast. At present, the ballast oil and water mixture is pumped overboard shortly before entering harbor, consequently fouling and polluting the sea. By international convention this can be done only in certain areas supposedly far enough from land to avoid serious shoreline pollution. However, with the increase in oil-fueled shipping, even these restrictions are not sufficient. They are also difficult to enforce because an unballasted ship is more difficult to control since it will ride high in the water and be more affected by wind and wave action. This can become a serious navigational problem as heavy seagoing traffic converges at the approaches to harbor entrances.

Even more serious is accidental discharge from ships close to shore or from underwater oil drilling operations, both of which have occurred recently in England, and in California. Shoreline damage from such accidents could be greatly minimized by enclosing the area with float-supported weight plastic curtains and using a ship equipped with this invention, stationed at a point within the enclosure. This point would be selected, with due respect to current, wind and wave action, for maximum oil concentration. Such ships would pump the water oil mixture through its separators and retain the oil in tanks aboard the ship while dumping relatively clean water overboard beyond the enclosure.

In all cases mentioned above, in addition to preventing water and shoreline pollution there is the economic advantage of salvaging usable oil at substantial savings.

Initial investigation of possible means of stripping residual fuel oil from water showed that, while water alone, and a well-dispersed emulsion of 7 percent oil in water, would flow through a 25 micron (0.001 test screen under 0 head pressure, it required only a pressure equivalent to 3.5 inch water (0.126 p.s.i.) to force the oil alone through the same test screen. Such a small differential for oil alone and the zero differential for the 7 percent emulsion indicated that any type of straining or filtering mechanism appeared to be impractical and uneconomical. Apparatus for this service must be capable of handling large volumes of liquid; 100 to 1,000 gallons per minute would be a typical range. These flows would require enormous open area in a filter if restricted to 0.126 p.s.i. differential pressure. Also 25 microns is about the lower limit of any practical self-cleaning filter and this equipment must be self-cleaning for continuous operation.

By definition, a strainer or a filter is a device for retaining discrete particles while allowing a liquid to flow through. Obviously, by this definition, the object of this investigation was not a filter or a strainer but a device for separating two fluids which, for want of a better term, we shall call a separator.

Examination of the physical characteristics of the two fluids under investigation showed the following:

| | Residual Fuel Oil | Water |
|---|---|---|
| Viscosity at 70° F. | 36,710 S.S.U. | 31.5 S.S.U. |
| Surface Tension at 70° F. | 35.5 dynes/cm. | 73.05 dynes/cm. |
| Specific Gravity at 70° F. | 0.969 | 1.00 |

One other characteristic was also noted —the high tenacity adherence of the residual fuel oil to metals and to itself. This characteristic is well known and has been made use of in the past particularly for so-called "oil skimmers." These are essentially rotating metal drums which are partially immersed in an impounding pond covered with oil. The oil sticks to the drum and is scraped off above the water level with a doctor blade and conveyed to an oil tank for later disposal. This removes much of the oil from the surface of the pond to make room for further additions while relatively clean water is pumped out from well beneath the surface after a few days settling time. Such a system does not satisfy the requirements of immediate and continuous separation, but it suggested a modification which might have promise. This was to use a commercially available Cuno Auto Klean Strainer which consists of rimmed, spoked discs separated by spoked spacers and which are available in spacings as low as 88 microns (0.0035 inch) and are equipped with cleaner blades which are inserted into the 75 micron slot. Rotation of the stack of discs and spacers relative to the fixed cleaner blades cleans the slot of filtered contaminants in normal filtration usage. It was reasoned that with a mixed oil-in-water emulsion flowing through the relatively deep slot (0.088 inch), the oil would tend to coat the sidewalls of the slot, thus narrowing this orifice. Furthermore, oil droplets would tend to agglomerate in the narrow slot and also adhere to oil already coating the sidewalls and resulting flow at the inside diameter of the rim of the disc would be essentially clean fluid. The slot would be expected to plug eventually with oil but rotation of the filter cartridge would allow the cleaner blades to clear the slot of oil and reinstitute flow. This would produce a device similar to the rotating drum to provide a surface on which to collect the oil phase except having additional oil-collecting area in the slots and the slots would allow relatively clean water flow into the center of the discs. Such a device was tested across a wide range of flows and differential pressures and produced absolutely no separation of the two fluids.

Analysis of these results, examination of the device itself, and a review of the theory were inconclusive. Closer examination of the device itself showed that some oil had collected on the outside diameter of the rim of the disc but the slot itself was clean. This led to the conclusion that a uniform flow velocity through the slot at any reasonable water-discharge rate was sweeping the slot clean. Some way had to be devised to drastically slow the velocity through the length of the slots to prevent washing away the deposited oil and allow time for oil droplet agglomeration within the slot itself before allowing the water phase to exit through the final orifice which still had to be very small to prevent passage of the oil phase at reasonable pressure differentials.

A device was accordingly assembled very similar in construction to the first device but with the slot between discs now 0.012 inch instead of 0.003 inch thus reducing flow velocity by a factor of 4. This slot led to two orifices of 0.0015 inch to give the equivalent open area of the former 0.003 inch slot. For convenience this unit was assembled from parts normally used in a commercially available filter known as the Cuno Super Auto-Klean. A test of this device produced excellent separation but would plug rapidly when the oil phase plugged the enlarged slot, even when the device was rotated past the cleaner blades at the speed of 3 r.p.m. normally used in general filtration practice. Since the cleaner blades operate in the oil phase where good lubrication could reasonably be expected this rotational speed was increased by a factor of 6.3 to 19 r.p.m. This provided adequate cleaning of the oil phase from inside the slots and provided excellent separation and clean-water flow. This device was now a combination filter separator which would separate the oil phase from the water phase, deliver relatively clean water, filtered of particulate contamination and relatively pure oil combined with all of the particulate matter in the original mixture. This entrainment of particulate matter in the oil is not serious and will not affect reuse since it is general practice to use a fuel filter ahead of the oil burner nozzle to remove normal contaminants such as tank and pipe scale, sand, grit, dirt, etc.

It is the prime object of this invention to provide a device for continually separating a mixture, or suspension, or emulsion of two or more incompletely miscible fluids of different viscosities and/or specific gravities and/or adhesive qualities into its separate components.

Further objects of the invention include:

a. The provision of a system wherein the components of the prior described mixtures, or suspensions or emulsions are separated from each other and delivered in separate streams in a relatively pure state suitable each for their intended purpose of reuse or disposal.

b. The provision of a system as described in (a) which will deliver one of its components filtered essentially free of particulate matter and another component containing essentially all of the particulate contamination present in the original mixture or suspension or emulsion.

c. The provision of a system as described in (a) which may, if desired, be functionally inactive when any one of its component liquids is flowing through it.

d. The provision of a system as described in (a) including a separator housing affording holding capacity for the separated component both above and below the separator itself.

e. The provision of a system as described in (a) including a separator housing with baffles so located as to afford separating time within the housing to allow some separation by specific gravity prior to the separator and thereby reduce the load on the separator.

f. The provision of control means wherewith overloading of the separator means may be averted and the water flow therethrough may be maintained at a maximum consonant with predetermined quality of effluent.

The above objects and others together with a full explanation of the invention may be learned by perusal of the following specifications with the accompanying drawings and claims.

Referring to the drawings.

Figure 1:
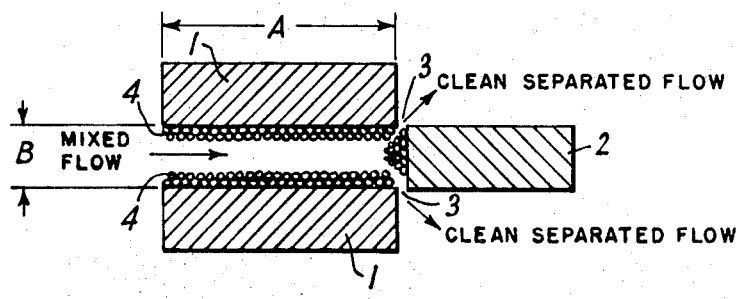
FIG. 1 is an enlarged schematic cross section of the critical flow path through an element of the device.

FIG. 1 schematically depicts the critical flow path through the filter/separator device. Item 1 is the outer disc, item 2 is the inner disc. Item 3 is the flow orifice into the center of the filter/separator created by the difference between the outside diameter of item 2 and the inside diameter of the outer rim of item 1. This clearance is critical and must be selected to afford the maximum pressure drop against passage of the higher viscosity fluid. For so-called "Bunker C" residual fuel oil it is approximately 0.002 inch. Item 4 represents oil globules adhering to the walls of the slot. Dimension "A" is the depth of the slot and Dimension "B" is the height of the slot. Let us consider Dimension B first; this determines the velocity of flow through the slot and must be at least 4 times the total critical dimension of the orifice or orifices fed by the slot. A, the length of the slot determines the time available for a droplet of the more viscous liquid entering at the center of the slot to either settle on the bottom of the slot or rise to the top. Therefore, a maximum length is beneficial, all other things considered, but again, experience indicates that a minimum ratio of 6 times the B dimension is critical. Both A and B dimensions can, of course, be modified in accordance with the difference in specific gravity and viscosity of the fluids and with the droplet size of the more viscous of the fluids, but in no case should the limits set above the violated.

The exact mechanism of the separation is not clear at the present time but the best hypothesis is that the more viscous liquid does coat the side and bottom walls of the slot in the manner shown. Our early experiments showed that residual fuel oil would flow through a 0.001 inch square opening under a pressure of 0.126 p.s.i. Tests have proved that with a 0.002 inch orifice flow can be maintained under pressures of 0.287 p.s.i. and with a 0.0015 inch orifice pressures can be raised to 0.500 p.s.i. without breakthrough of the residual fuel oil. Present hypothesis is that the oil does coat the walls of the slot with sufficient adherence to slightly restrict the orifice.

Figure 2:
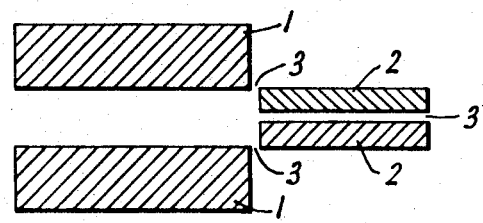
FIG. 2 is another embodiment be FIG. 1, except with additional orifices for increased flow capacity.

FIG. 2 shows another embodiment similar to FIG. 1 except with additional orifice(s) for additional flow capacities. All dimensional relationships used in the prior description of FIG. 1 would apply here as well.

The structure of the strainer employed in the present embodiment is similar to the structure shown in U.S. Pat. No. 2,873,030, issued to Philip E. Ashton, Feb. 10, 1959, which may be referred to for further details.

Figure 3:
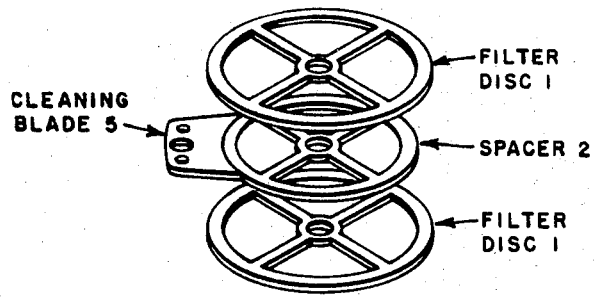
FIG. 3 is an expanded view of the parts making up the critical flow paths shown in FIG. 1, as well as an elevation cross section through a stack of such parts.
Figure 3:
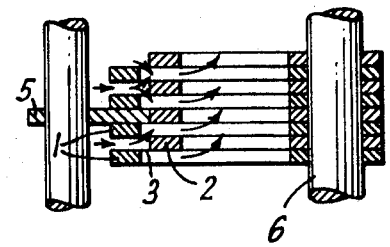

FIG. 3 shows an expanded section of the parts making up FIG. 1 showing items 1 and 2, as well as item 5 the cleaner blade and item 6 the spindle on which items 1 and 2 are mounted and which in our application is motor driven to revolve the discs past the cleaner blades. As shown in FIG. 1, droplets of the more viscous of the fluids will coat the sidewalls of the slot and eventually plug off all flow. To reinstitute flow, the filter/separator assembly is rotated past the cleaner blades 5 which are inserted in the slots. This rotation causes the cleaner blades to pick up the viscous fluid and carry it beyond the outside of the slot where it will either float to the top of the filter/separator housing or settle to the bottom according to its specific gravity. Plugging of the slot under normal flow conditions occurs so fast that it was found necessary to rotate the filter element at a speed of approximately 40 inches per minute, measured at the bottom of the slot, in order to maintain continuous flow, with one set of cleaner blades; if two sets are used the speed can be cut in half plus an adjustment for the lost area covered by the second set of blades. This speed is over 6 times that used in normal particulate filtration. It should, of course also be adjusted for the actual percentage of the more viscous fluid in the mixture or emulsion as overcleaning tends to decrease the purity of the fluid probably due to the loss of the restricting effect of the deposited more viscous material near the edges of the orifices.

Figure 4:
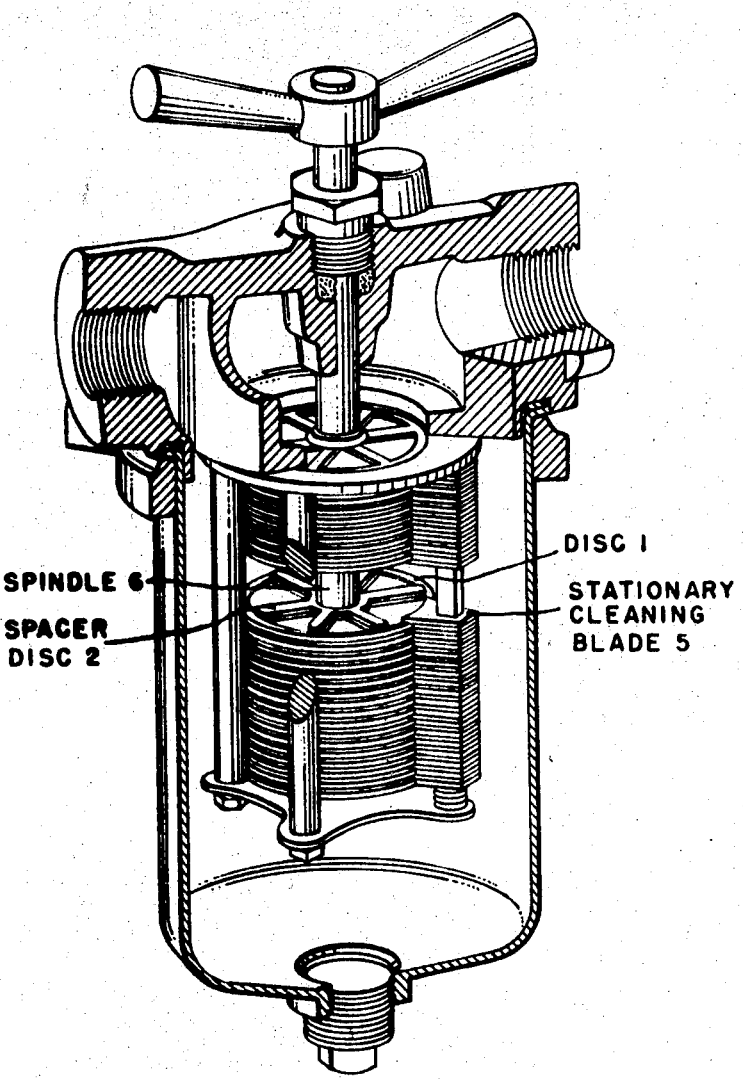
FIG. 4 is an isometric view of a device based on FIG. 1.

FIG. 4 is an isometric sectional elevation of a small manually rotated unit mounted in a housing showing all of the items heretofore mentioned assembled in a housing.

Figure 5:
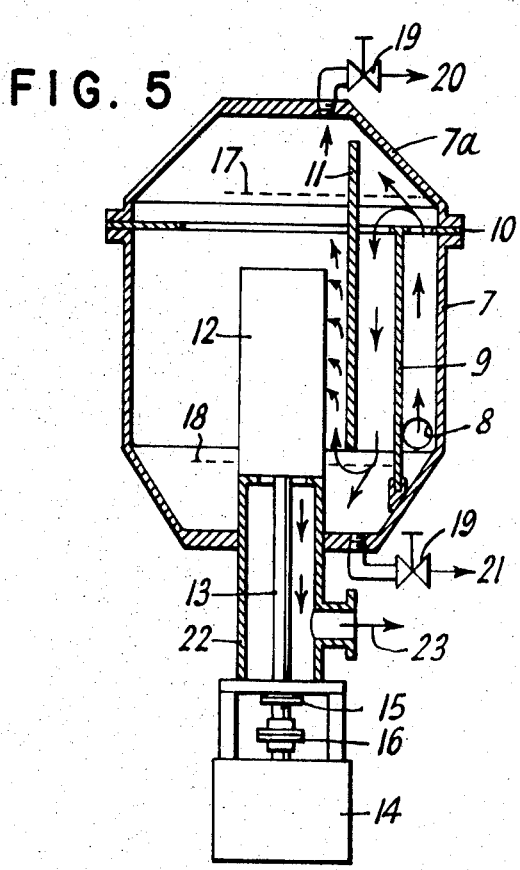
FIG. 5 is a cross-sectional elevation view of the device enclosed in a housing.

FIG. 5 is a cross-sectional elevation view of the filter/separator installed in a special housing preferred for this system. The mixed fluid enters the pressure housing 7 through a tangential inlet item 8 and flows upward in the annulus between the shell wall and outer baffle item 9 which is affixed to baffle support spider item 10. The fluid then makes a 180° turn to flow downward through item 10 again and into the annulus between outer baffle item 9 and inner baffle item 11. At the point of the 180° turn the first gravity separation in the mixed fluids takes place as the low specific gravity component continues flowing towards the top of the housing cover item 12. The downward flow of fluid then makes a 180° turn at the bottom of inner baffle item 11 and the filter separator assembly item 12 and thereby into the filter/separator cartridge. The more viscous fluid is deposited on the surface of the slots of item 12 as shown in the description of FIG. 1 and is continually scraped off by cleaner blades item 5 as the cartridge is continually rotated by means of cartridge spindle item 13 rotated by motor reducer assembly item 14. Item 15 is the gland seal for spindle item 13 and item 16 is a coupling connecting items 13 and 14. This more viscous fluid, as it is scraped from the filter separator slots, rises to the top of the housing or settles to the bottom according to its specific gravity. Items 17 and 18 indicate respectively the controlled interface location of these fluids as they collect at the top and bottom of the housing. These interface locations are controlled by means of automatic valves item 19 sensing the interface location by probes (not shown) fitted into the top and bottom of the housing. These valves thus control the flow out of upper and lower discharge ports items 20 and 21, respectively, as well as maintaining the interface and preventing flow of non-separated fluid from the these ports.

The clean separated fluid which has passed through the filtering orifices item 3 shown in FIG. 1 flows down the center of the filter/separator cartridge through conduit item 22 and finally through the clean-fluid outlet item 23.

Figure 6:
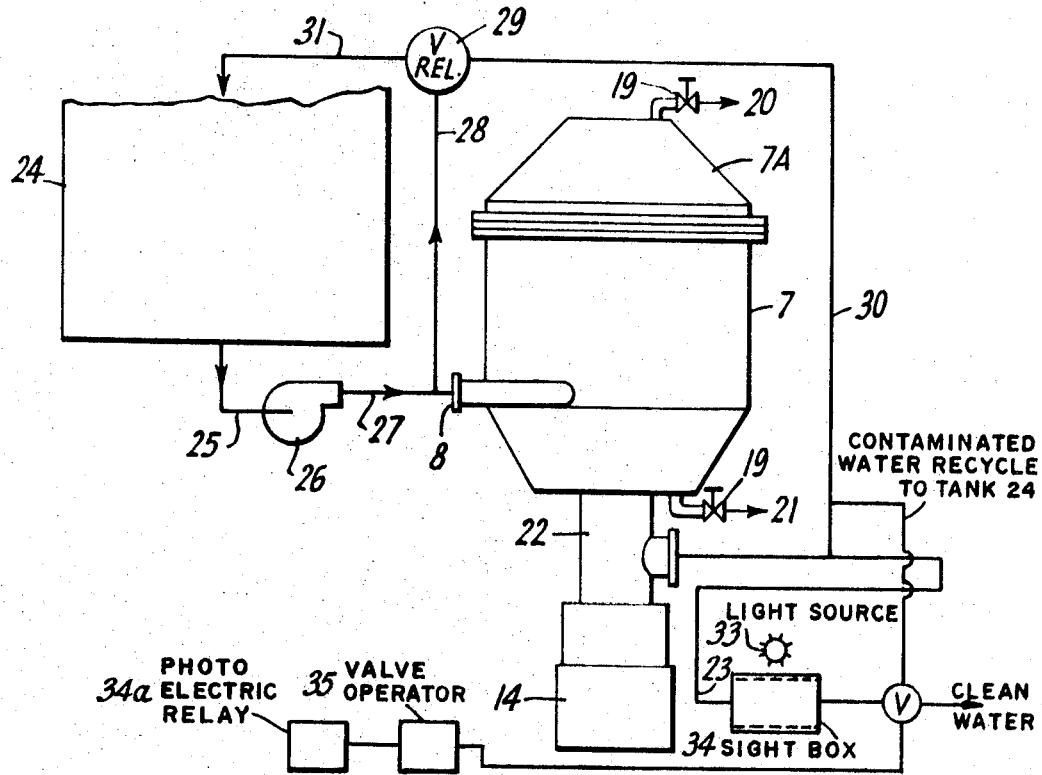
FIG. 6 is a simplified schematic diagram of the system with piping and controls shown.

FIG. 6 is a simplified schematic flow diagram of the system showing item 24, a holding tank for the mixture, or suspension or emulsion, item 25 piping means for conducting such fluid mixture to a pump item 26 and thence to the filter-housing tangential inlet item 8. From piping means 27 additional piping means 28 branch off to a differential pressure relief valve item 29 which is connected by a pressure-sensing pipeline item 30 to the outlet item 23 of the filter separator housing. When item 29 detects a differential pressure across the inlet item 8 and the outlet item 23 in excess of its preset pressure, it will open and divert flow back to the holding tank item 24 via pipe 31 thereby reducing flow entering item 8 and maintaining an essentially constant pressure across the filter separator housing to prevent discharge of the more viscous component through item 23. Since differential pressure across the filter will be low, generally in the range of 0.5 p.s.i. and the system pressure will also be low, in the range of 10 to 50 p.s.i., it is obvious that the piping could be arranged to work on the suction side of a pump installed at 23 with additional discharge pumps located at items 20 and 21. Also, additional sensing means could be located at all discharge ports of the filter housing to monitor and also control the quality and quantity of the fluids emerging from these discharge ports. Such sensing means might include a photoelectric cell which operates in conjunction with an automatic valve in line 23, which is the outlet of the filter separator housing. Such an arrangement includes, as well known in the art, a light source 33, a sight box 34 and a photoelectric relay, the relay being electrically connected to a valve operator 35 which opens and closes valve 36 in response to breaking of a light beam by the light source and the photoelectric relay. Should the material passing through line 23 contain too much contaminant, the beam of light from the light source would not be able to pass through the sight box and continuously energize the photoelectric relay. Consequently, the photoelectric relay will operate to open valve 36 by energizing the valve operator and permitting contaminated water to by recycled to tank 24. It should be understood that any suitable sensing device other than the photoelectric cell arrangement could be also employed.

While I have shown and described some embodiments of my invention, it is not to be limited to all of the details shown or to the particular process steps described, but is capable of modification and variation within the spirit of the invention and the scope of the appended claims.

It can be seen that the objects set forth above and those made apparent from the preceding description have been attained.

What is claimed is:

1. A system for the separation of oil from an oil in water mixture, comprising:
   a housing having inlet means for receiving flow of oil in water mixture and outlet means for discharging oil and water therefrom;
   a liquid/liquid separator means disposed in said housing between said inlet and outlet means, and including a plurality of continuously cleanable ring members forming a plurality of slots with orifices at the downstream ends of the formed slots;
   each of said slots having a length approximately 6 times its width and providing surfaces for the adherence of oil from the oil in water mixture;
   said orifices being of a size within a range of 0.001 to 0.0015 inch; and
   means for maintaining a pressure differential in a range of 0.126 to 0.500 p.s.i. across said separator means for continuous separation of oil from water.

2. The system according to claim 1, and said separator means further including:
   a plurality of rotatable blade members each disposed in a different one of the formed slots for removing, when rotated, adhered oil from slot surfaces 3. The system according to claim 2, wherein:
   said outlet means comprises a first outlet for water, a second outlet for oil when lighter than water, and a third outlet for oil when heavier than water.

4. The system according to claim 3 further comprising:
   baffle means disposed in said housing between said inlet and separator means reversing inlet flow of oil in water mixture at least one time for separating oil from water due to differences in specific gravity of the liquids.

5. The system according to claim 2, wherein:
   said outlet means comprises separate outlets for water and for oil.

6. The system in accordance with claim 5 further comprising:
   means for diverting at least a part of the flow of oil in water mixture from entering the inlet means when the pressure differential across said separator exceeds the range being maintained.

7. The system in accordance with claim 5 further comprising:
   means for sensing the oil content of the water discharged by said outlet means and for recirculating said water to said inlet means when said oil content exceeds a predetermined limit.

8. The system in accordance with claim 7 wherein:
   said sensing means is a photoelectric cell sensitive to the change in light transparency caused by the number of oil parts in the water.

9. The system according to claim 5 further comprising:
   baffle means disposed in said housing between said inlet and separator means reversing inlet flow of oil in water mixture at least one time for separating oil from water due to differences in specific gravity of the liquids.

10. The system in accordance with claim 9 further comprising:
    means for diverting at least a part of the flow of oil in water mixture from entering the inlet means when the pressure differential across said separator exceeds the range being maintained.

* * * * *